United States Patent
Kaufhold et al.

(10) Patent No.: US 6,527,995 B1
(45) Date of Patent: Mar. 4, 2003

(54) PROCESS FOR PREPARING SOFT, ELASTIC POLYURETHANE

(75) Inventors: Wolfgang Kaufhold, Köln (DE); Hans-Georg Hoppe, Leichlingen (DE); Wolfgang Bräuer, Leverkusen (DE); Jürgen Winkler, Langenfeld (DE); Hans-Georg Wussow, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 173 days.

(21) Appl. No.: 09/610,832

(22) Filed: Jul. 6, 2000

(30) Foreign Application Priority Data

Jul. 15, 1999 (DE) .......................... 199 33 261
Sep. 6, 1999 (DE) .......................... 199 42 393

(51) Int. Cl.$^7$ .......................... D04H 1/54; D04H 13/02
(52) U.S. Cl. .......................................... 264/126
(58) Field of Search .......................... 264/126, 331.19, 264/109–125, 127, 128

(56) References Cited

U.S. PATENT DOCUMENTS

| | | | |
|---|---|---|---|
| 5,218,058 A | 6/1993 | Zeitler et al. | 525/453 |
| 5,541,277 A | 7/1996 | Muhlfeld et al. | 528/28 |
| 5,908,690 A | 6/1999 | Schultze et al. | 428/220 |

FOREIGN PATENT DOCUMENTS

| | | |
|---|---|---|
| CA | 1236239 | 5/1988 |
| CA | 1257946 | 7/1989 |
| DE | 29 01 774 | 7/1980 |
| DE | 3932923 | 4/1991 |
| DE | 43 39 475 | 5/1995 |
| EP | 111682 | 6/1984 |
| EP | 134455 | 3/1985 |
| WO | 99/31158 | 6/1999 |

OTHER PUBLICATIONS

Kunststoff–Handbuch "Polyurethane", vol. 7, 2$^{nd}$ edition, p. 469, (month unavailable) 1983, Edited by Dr. G. Oertel, Carl Hanser Verlag, Munich, Vienna, Folien.

*Primary Examiner*—Stephen J. Lechert, Jr.
(74) *Attorney, Agent, or Firm*—Joseph C. Gil; Aron Preis; James R. Franks

(57) ABSTRACT

A process for producing a thermoplastic polyurethane film by means of sintering a particulate thermoplastic polyurethane in a heated mold, is described. The thermoplastic polyurethane has: (i) a melt index of 20 to 100, measured at 190° C. and under an applied force of 21.2 N; (ii) a relative solution viscosity of 1.15 to 1.45, the relative solution viscosity being determined by, measuring the viscosity (a) of a solution of 0.4 grams of the thermoplastic polyurethane in 99.7 grams N-methyl-2-pyrrolidone containing 0.1% dibutylamine at 25° C., measuring the viscosity (b) of N-methyl-2-pyrrolidone containing 0.1% dibutylamine at 25° C., and dividing viscosity (a) by viscosity (b); and (iii) a Shore hardness of 80 to 98.

8 Claims, No Drawings

PROCESS FOR PREPARING SOFT, ELASTIC POLYURETHANE

CROSS REFERENCE TO RELATED PATENT APPLICATION

The present patent application claims the right of priority under 35 U.S.C. §119 (a)–(d) of German Patent Application No. 199 33 261.4, filed Jul. 15, 1999, and German Patent Application No. 199 42 393.8, filed Sep. 6, 1999.

FIELD OF THE INVENTION

This invention relates to soft, elastic thermoplastic polyurethane films (TPU films), which are produced by sintering pulverulent thermoplastic polyurethanes—also referred to below by the abbreviation TPU—with the aid of a heated mould, a process for their production and their use.

BACKGROUND OF THE INVENTION

The production of PU films (polyurethane films) by casting from liquid PU formulations or by extrusion of TPU is known and is described, for example, in Kunststoff-Handbuch "Polyurethane", Volume 7, Second Edition, page 469 (edited by Dr. G. Oertel; Carl Hanser Verlag, Munich, Vienna, 1983).

SUMMARY OF THE INVENTION

Starting from the liquid formulations, either blocks are cast and films are cut from them, or the films are produced directly in the centrifugal-moulding process. Films made from TPU in thicknesses of 0.03 to 0.3 mm are conventionally produced in the blowing process; thicker films, for example, up to about 3 mm, are produced by slot-die extrusion. The production of PU films from TPU by sintering is not mentioned in the monograph cited above.

The use of decorative plastics films in the interiors of motor vehicles is also known [R. Pfriender, Kunststoffe, 76 (1986), 10, page 960 ff.]; here the plastics mouldings are coated with films or the films or skins are foamed at the back with foamed plastics, preferably PU foamed plastic.

Where PU is used, the surface layers are in most cases produced from two-component PU systems by the IMC (in-mould coating) process. In this process the mould, heated to about 50° C., is first of all sprayed with a release agent, then the PU two-component coating and subsequently the PU supporting layer are introduced into the open mould. This manufacturing technique for the production of corresponding component parts is arduous and to date has hardly been used by processing technicians (Dr. M. Wachsmann, Kunststoffberater, 10/1987, pages 27 to 28).

DE-A 4 203 307 discloses the use of aliphatic TPU powders for producing sintered films. In DE-A 4 203 307 no reference is made to a specific melt index range (MVR range) which would result in a favourable processing behaviour. On the contrary, a very wide MVR range is covered by the range of the NCO to OH ratio (index) mentioned, extending from 97 to 99.

In prior art, PVC/ABS films are conventionally formed by the thermoforming process and subsequently foamed at the back in a second processing step. PVC films can be produced by the PVC powder slush process. For this, the mould is heated in a furnace to about 250° C., the pulverulent PVC is then distributed evenly in it and the mould is again heated in the furnace in order to gel the PVC skin. After the mould has been cooled, for example, in a water bath, the film can be removed and then foamed at the back. The films produced by the PVC powder slush process are considerably less expensive than ABS/PVC films, PU IMC films and TPU films. A disadvantage of mouldings made from PVC films foamed at the back with PU foamed plastics is the negative interaction of the PVC film and the PU backing foam. Thus constituents such as, for example, catalysts, stabilisers et cetera diffuse out of the PU foamed plastic into the decorative film, and conversely the plasticiser migrates from the PVC film into the PU foamed plastic. As a result of these migration processes, the mouldings are mechanically damaged, for example, by contraction or embrittlement, and their appearance is altered as a result of discoloration and specking (Kunststofftechnik, VDI Verlag GmbH, Düsseldorf, 1987, "Kunststoffe als Problemlöser im Automobilbau", pages 141 ff.).

EP-A 399 272 describes elastic polyurethane films which are produced from pulverulent TPUs by sintering. A melt index (MVR) [at 190° C. and an applied weight of 212 N] of from 50 to 350 is specified for the TPUs. It is expressly stated in EP-A 399 372 that a TPU which is suitable for the sintering process has to meet the criteria mentioned with regard to melt index. The required high processing temperatures of 220° C. to 280° C., preferably of 230° C. to 270° C., are a disadvantage. At these high processing temperatures TPUs in general, and particularly TPU based on polyethers, tend firstly to undergo a molecular weight decrease as a result of chain splitting (deterioration of the mechanical properties) and secondly, above all in TPUs based on polyethers and/or aromatic diisocyanates, to become yellow (discoloration even of dyed test pieces; see also the Dissertation by Wolfgang Endres in the Faculty of Chemistry at the University of Osnabrück, 1994). A TPU which has an MVR of 50 at 190° C. and 212 N exhibits an MVR of 2 at 21.2 N and 190° C. A TPU which has an MVR of 40 at 190° C. and 21.2 N exhibits an MVR of>500 at 212 N and 190° C., that is, the TPU "runs through" and is no longer measurable. The high processing temperatures of 220° C. to 280° C. described in EP-A 399 272 are also disadvantageous owing to the associated long cycle times as a result of the long cooling and heating times.

The object of the present invention, accordingly, was to provide a material which can be processed into films in the sintering process even at low processing temperatures of 180° C. to 215° C., preferably 190° C. to 215° C.

Surprisingly, this object was achievable by means of TPU films produced from certain TPUs by sintering.

The invention provides soft, elastic thermoplastic polyurethane films obtainable by sintering pulverulent thermoplastic polyurethanes—also referred to below by the abbreviation TPU—having a melt index at 190° C. and at an applied weight of 21.2 N (2.16 kp) of from 20 to 100, preferably 30 to 60, and a relative solution viscosity of from 1.15 to 1.45, preferably of 1.25 to 1.35, as well as a Shore hardness of from 80 to 90, preferably from 85 to 94, with the aid of a heated mould, the pulverulent TPU being obtainable by the reaction of a) organic diisocyanates, b) a polyol (polyether diol, polyester diol, polycarbonate diol or mixtures thereof)

c) a chain extender (diol or diol/diamine mixture) and d) optionally conventional auxiliary substances and additives.

In connection with the production of the TPU films according to the invention, the sintering of TPUs includes the following processes: production by the "powder slush process", as described, for example, in DE-A 3 932 923; production by the calendering process, as described, for example, in Kunststoff-Handbuch "Polyurethane", Volume 7, or production by the coextrusion process, as described, for example, in Ullmann's Encyclopedia of Industrial Chemistry, Sixth Edition.

The pulverulent TPU is obtained preferably by the reaction of
- a) aromatic diisocyanates, preferably 4,4'-diphenylmethane diisocyanate,
- b) a polyol having an average molecular weight of between 600 and 5000 g/mol,
- c) a chain extender having an average molecular weight of between 60 and 500 g/mol and
- d) optionally conventional auxiliary substances and additives.

TPUs based on aromatic diisocyanates are not particularly suitable for applications having especially high requirements with regard to light resistance. In EP-A 399 272 it is stated that TPUs based on aliphatic diisocyanates are light-resistant, but that they can be handled only with difficulty after thermoplastic processing. For that reason, mixtures with TPUs based on aromatic diisocyanates are proposed. However, in many cases these mixtures likewise do not meet the high requirements with regard to light resistance. These high requirements are only met, surprisingly, if the TPUs are built up predominantly (more than 90 wt. %) on the basis of aliphatic diisocyanates. It has now been found that a satisfactory handling of these aliphatic TPUs is achieved even after thermoplastic processing, if the above-mentioned pulverulent TPU is obtained by the reaction of
- a) hexamethylene diisocyanate,
- b) a polyol having an average molecular weight of between 600 and 5000 g/mol,
- c) a chain extender having an average molecular weight of between 60 and 500 g/mol and
- d) optionally conventional auxiliary substances and additives.

Depending on the requirements placed on the moulding obtainable from the TPU according to the invention, the hexamethylene diisocyanate (HDI) may be partially replaced by one or more other aliphatic diisocyanates, in particular isophorone diisocyanate (IPDI), 1,4-cyclohexane diisocyanate, 1-methyl-2,4-cyclohexane diiso- cyanate, 1-methyl-2,6-cyclohexane diisocyanate and isomeric mixtures thereof, 4,4'-, 2,4'- and 2,2'-dicyclohexylmethane diisocyanate and isomeric mixtures thereof.

Light-resistant, thermoplastic polyurethane films are preferably obtained when the above-mentioned pulverulent TPU is obtained by the reaction of
- a) 95 to 70 mol. % hexamethylene diisocyanate and 5 to 30 mol. % of other aliphatic diisocyanates,
- b) a polyol having an average molecular weight of between 600 and 5000 g/mol,
- c) a chain extender having an average molecular weight of between 60 and 500 g/mol and
- d) optionally conventional auxiliary substances and additives.

Light-resistant, thermoplastic polyurethane films are particularly preferably obtained when the above-mentioned pulverulent TPU is obtained by the reaction of
- a) 100 to 60 mol. %, preferably 100 to 70 mol. %, particularly preferably 100 to 80 mol. % hexamethylene diisocyanate (HDI) and 0 to 40 mol. %, preferably 0 to 30 mol. %, particularly preferably 0 to 20 mol. % of other aliphatic diisocyanates,
- b) a polyol having an average molecular weight of between 600 and 5000 g/mol, c) 80 to 100 wt. % 1,6-hexanediol and 0 to 20 wt. % of a chain extender having an average molecular weight of 60 to 500 g/mol and
- d) optionally conventional auxiliary substances and additives.

The pulverulent TPU can also be obtained by the reaction of
- a) aromatic diisocyanates, preferably 4,4'-diphenylmethane diisocyanate and/or aliphatic diisocyanates, preferably hexamethylene diisocyanate, isophorone diisocyanate and/or 4,4'-dicyclohexylmethane diisocyanate,
- b) a polyol having an average molecular weight of between 600 and 5000 g/mol,
- c) a chain extender having an average molecular weight of between 60 and 500 g/mol and
- d) optionally conventional auxiliary substances and additives.

The pulverulent TPU can, based on 100 parts by weight, also consist of
- a) 40 to 99.5 parts by weight of a TPU (A) prepared using aromatic diisocyanates, preferably 4,4'-diphenylmethane diisocyanate and
- b) 0.5 to 60 parts by weight of a TPU (B) prepared using aliphatic diisocyanates, preferably selected from among 1,6-hexamethylene diisocyanate, isophorone diisocyanate and/or 4,4'-dicyclohexylmethane diisocyanate.

Linear hydroxyl-terminated polyols having an average molecular weight of from 600 to 5000 g/mol, preferably from 700 to 4200 g/mol, are used as component b). Owing to the conditions during production, these frequently contain small quantities of non-linear compounds. For this reason, they are often also referred to as "substantially linear polyols".

Suitable polyester diols can be prepared, for example, from dicarboxylic acids having 2 to 12 carbon atoms, preferably 4 to 6 carbon atoms, and polyhydric alcohols. Examples of suitable dicarboxylic acids are: aliphatic dicarboxylic acids, such as succinic acid, glutaric acid, adipic acid, suberic acid, azelaic acid and sebacic acid and aromatic acids, such as phthalic acid, isophthalic acid and terephthalic acid. The dicarboxylic acids may be used separately or as mixtures, for example, in the form of a mixture of succinic, glutaric and adipic acid. To prepare the polyester diols it may possibly be advantageous to use the corresponding dicarboxylic acid derivatives, such as carboxylic diesters having 1 to 4 carbon atoms in the alcohol group, carboxylic anhydrides or carboxylic acid chlorides, instead of the dicarboxylic acids. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the properties required, the polyhydric alcohols may be used alone or optionally mixed with one another. Esters of carbonic acid with the above-mentioned diols are also suitable, in particular with those diols having 4 to 6 carbon atoms, such as 1,4-butanediol or 1,6-hexanediol, condensation products of hydroxycarboxylic acids, for example, hydroxycaproic acid and polymerisation products of lactones, for example, optionally substituted caprolactones. The polyester diols preferably used are ethanediol polyadipates, 1,4-butanediol polyadipates, ethanediol- 1,4-butanediol polyadipates, 1,6-hexanediol-neopentyl glycol polyadipates, 1,6-hexanediol-1,4-butanediol polyadipates and polycaprolactones. The polyester diols have average molecular weights of from 600 to 5000, preferably of 700 to 4200, and may be used separately or in the form of mixtures with one another. Suitable polyether diols can be prepared by reacting one or more alkylene oxides having 2 to 4 carbon atoms in the alkylene group with a starter molecule containing two bonded active hydrogen atoms. Alkylene oxides which may be mentioned are, for example, ethylene oxide, 1,2-propylene oxide, epichlorohydrin and 1,2-butylene oxide and 2,3-butylene oxide. It is preferable to use ethylene oxide, propylene oxide and mixtures of 1,2-propylene oxide and ethylene oxide. The alkylene oxides may be used separately, alternately in succession or as mixtures. Examples of suitable starter molecules are: water, amino alcohols such as N-alkyldiethanolamines, for example, N-methyldiethanolamine, and diols, such as ethylene glycol, 1,3-propylene glycol, 1,4-butanediol and 1,6-hexanediol. Mixtures of starter molecules may optionally also be used. The hydroxyl-containing polymerisation products of tetrahydrofuran are also suitable polyether diols. Trifunctional polyethers can also be used in quantities of 0 to 30 wt. %, based on the bifunctional polyethers, but in a maximum quantity such that a thermoplastically workable product is formed. The substantially linear polyether diols have molecular weights of from 600 to 5000, preferably of 700 to 4200. They may be used both separately and in the form of mixtures with one another.

The compounds used as component c) are diols or diamines having on average 1.8 to 3.0 Zerewitinoff-active hydrogen atoms per molecule and a molecular weight of from 60 to 500 g/mol, preferably aliphatic diols having 2 to 14 carbon atoms, such as, for example, ethanediol, 1,6-hexanediol, diethylene glycol, dipropylene glycol and in particular 1,4-butanediol. But diesters of terephthalic acid with glycols having 2 to 4 carbon atoms are also suitable, such as, for example, terephthalic acid with bis(ethylene glycol) or terephthalic acid with bis(1,4-butanediol), hydroxyalkylene ethers of hydroquinone, such as, for example, 1,4-di(β-hydroxyethyl)hydroquinone, ethoxylated bisphenols, such as, for example, 1,4-di(β-hydroxyethyl) bisphenol A, (cyclo)aliphatic diamines, such as, for example, isophorone diamine, ethylenediamine, 1,2-propylenediamine, 1,3-propylenediamine, N-methylpropylene-1,3-diamine, N,N'-dimethylethylenediamine and aromatic diamines, such as, for example, 2,4-tolylenediamine and 2,6-tolylenediamine, 3,5-diethyl-2,4-tolylenediamine and/or 3,5-diethyl-2,6-tolylenediamine and primary mono-, di-, tri- and/or tetraalkyl-substituted 4,4'-diaminophenylmethanes. Mixtures of the above-mentioned chain extenders may also be used. Besides these, smaller quantities of triols may also be added.

In addition, small quantities of conventional monofunctional compounds can also be used, for example, as chain stoppers or mould-release agents. Examples which may be given are alcohols such as octanol and stearyl alcohol, or amines such as butylamine and stearylamine.

For the preparation of the TPUs, the structural components, optionally in the presence of catalysts, auxiliary substances and/or additives, are preferably reacted in quantities such that the equivalent ratio of NCO groups to the sum of the groups which are reactive with NCO, in particular the OH groups of low-molecular chain extenders and polyols, is 0.9:1.0, to 1.1:1.0, preferably 0.95:1.0 to 1.10:1.0.

Suitable catalysts according to the invention are the conventional tertiary amines known in prior art, such as, for example, triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organometallic compounds, such as titanate esters, iron compounds, tin compounds, for example, tin diacetate, tin dioctoate, tin dilaurate or the dialkyltin salts of aliphatic carboxylic acids, such as dibutyltin diacetate, dibutyltin dilaurate or the like. Preferred catalysts are organo-metallic compounds, in particular titanate esters, iron compounds and/or tin compounds.

Besides the TPU components and the catalysts, auxiliary substances and/or additives (d), in quantities of up to 20 wt. %, based on the total quantity of TPU, may also be added. They can be previously dissolved in one of the TPU components, preferably in component b), or optionally introduced in a tandem-arranged mixing unit such as, for example, an extruder, after the reaction is complete.

Examples which may be given are lubricants, such as fatty acid esters, metal soaps thereof, fatty acid amides, fatty acid ester amides and silicone compounds, antiblocking agents, inhibitors, stabilisers against hydrolysis, light, heat and discoloration, flameproofing agents, dyes, pigments, inorganic and/or organic fillers and reinforcing agents. Reinforcing agents are in particular fibrous reinforcing materials such as, for example, inorganic fibres, which are produced as in prior art and may also be treated with a size. More detailed infonnation about the above-mentioned auxiliary substances and additives may be found in the technical literature, for example, in the monograph by J. H. Saunders and K. C. Frisch, "High Polymers", Volume XVI, Polyurethanes, Parts 1 and 2, Interscience Publishers, 1962 and 1964; in Taschenbuch für Kunststoff-Additive, by R. Gächter and H. Müller (Hanser Verlag, Munich, 1990) or in DE-A 2 901 774.

The TPUs used according to the invention, which have a melt index at 190° C. and at an applied weight of 21.2 N (2.16 kp) of from 20 to 100, preferably 30 to 60, and a relative solution viscosity of from 1.15 to 1.45, preferably 1.25 to 1.35, can be prepared by the extruder or belt process or by the process described in the Application PCT/EP98/07753.

The TPUs described in EP-A 399 272, which exhibit a relatively high melt viscosity and the low MVR values associated with it, have a high content of free isocyanate groups. 0.05 to 0.1 wt. %, preferably 0.1 to 0.5%, is mentioned. It has now been found that the result of this high residual content of NCO groups is that the free NCO groups react and thereby increase the melt viscosity. The TPUs change during storage. This makes it difficult to establish previously selected narrow MVR ranges.

On the other hand, owing to their significantly lower melt viscosity and the higher MVR values associated with it, the TPUs according to the invention can be prepared with a significantly lower residual NCO content of 0.0 to 0.05 wt. % (based on the total weight). As the melt viscosity does not change appreciably during storage, the establishment of previously selected narrow MVR ranges does not present a problem.

The invention also provides a process for producing the soft, elastic TPU films according to the invention, which is characterised in that a pulverulent TPU or TPU mixture having a melt index at 190° C. and at an applied weight of 21.2 N (2.16 kp) of from 20 to 100, preferably 30 to 60, and a relative solution viscosity of from 1.15 to 1.45, preferably 1.25 to 1.35, as well as a hardness of from 80 to 98 Shore A, is sintered by means of a tempered mould.

Preferably the sintering is carried out at a mould temperature of 180° C. to 215° C., particularly preferably at 190° C. to 210° C.

The TPU used has an average particle size preferably of from 50 to 800 μm, particularly preferably of from 50 to 500 μm.

The TPUs and TPU mixtures described above are preferably used as pulverulent TPU or TPU mixture in the process according to the invention.

The moulding compositions according to the invention are suitable for the production of a great variety of mouldings, for example, films, in particular grained sintered films. In powder form, the polyurethane moulding compositions according to the invention can be sintered to form skins in heatable moulds by means of the known "powder slush process". The powder required for this is obtained from granules of the polyurethane moulding compositions according to the invention by means of cold grinding. The ground material is introduced into the heatable mould, one side of which is open, and within a short time is sintered on the inner wall of the heated surface. After the mould has been cooled down, the slush skin can be removed. The process is thus similar to the process for producing dashboard coverings from PVC skins. It is described, for example, in DE 3 932 923, as the "powder slush process". The TPU films according to the invention can be used, inter alia, as surface covering in vehicles used for transport.

The TPU films according to the invention are also suitable for application to substrates by means of coextrusion or calendering. Because of the low processing temperatures which are possible (180° C. to 215° C.), the films can also be used to coat substrates which, owing to their low softening points, cannot be coated with the TPUs described in EP-A 399 272.

A number of TPUs, measured at two different weights, are listed in Table 1. The distinct difference between the TPU films according to the invention and the films from EP-A 399 272 can be seen from these Examples.

In Table 2, the influence of the processing temperatures on the decrease in the molecular weight is obvious. The relative solution viscosity is proportional to the average molecular weight (see, inter alia, Dissertation by Wolfgang Endres in the Faculty of Chemistry at the University of Osnabrück, 1994).

The invention is explained in more detail by the following Examples.

EXAMPLES

TABLE 1

Melt index (MVR) at 190° C.

| | Applied weight | |
|---|---|---|
| Examples | 21.2N | 212N |
| Example 1 | 56 | >500 (runs through) |
| Example 2 | 40 | >500 (runs through) |
| Example 3 | 41 | >500 (runs through) |
| Example 4 | 90 | >500 (runs through) |
| Example 5 | 98 | >500 (runs through) |
| Example 6 | 30 | >500 (runs through) |
| Comparison 1 | 3 | 82 |
| Comparison 2 | 14 | 375 |
| Comparison 3 | 5 | 90 |

TABLE 2

Influence of the processing temperature on the decrease in the molecular weight

| Examples/ Comparison | SV* (powder) | MVR(190° C. with 21.2/212N) | SV (film after sintering)** | Sintering temperature | SV decrease*** |
|---|---|---|---|---|---|
| 3 | 1.273 | 41/>500 | 1.260(210° C.) | 210° C. | 5% |
| 4 | 1.263 | 90/>500 | 1.258(190° C.) | 190° C. | 2% |
| 5 | 1.303 | 98/>500 | 1.294(185° C.) | 185° C. | 3% |
| 6 | 1.339 | 30//>500 | 1.312(215° C.) | 215° C. | 8% |
| Comparison 1 | 1.558 | 3.2/82 | 1.401/(270° C.) | 270° C. | 39% |
| Comparison 3 | 1.48 | 5/90 | 1.336(270° C.) | 270° C. | 43% |

*Solution viscosity
**at the indicated temperature
***see explanation in the text.

Measurements of the SV of the powders gave a value of 1.245 for the powder in Example 1 and of 1.311 for the powder in Example 2.

The MVR values of the powders were also measured. SV decrease=(SV(powder)−1/(SV(film after sintering)−1)*100.

Production of the TPUs and TPU Films

The TPUs based on HDI were produced continuously in the following manner:

The mixture of polyol, chain extender and dibutyltin dilaurate was heated to approximately 110° C. in a tank, with stirring, and together with HDI, which was heated to approximately 110° C. by means of heat exchangers, was mixed intensively by a static mixer from the firm Sulzer (DN6 with 10 mixing elements and a shear rate of 500 s$^{-1}$), and then passed into the inlet of a screw conveyor (ZSK 32).

The whole mixture reacted in the extruder until the reaction was complete and was subsequently granulated.

The TPUs based on MDI were produced continuously in the following manner:

The mixture of polyol, chain extender and tin dioctoate was heated to approximately 130° C. in a tank, with stirring, and in the same way the MDI (approx. 120° C.), was passed into the inlet of a screw conveyor (ZSK 32) in a one-shot process.

The whole mixture reacted in the extruder until the reaction was complete and was subsequently granulated.

The additives were either dissolved in the polyol or metered continuously into the screw conveyor.

Under cooling with liquid nitrogen, the respective granules were ground to a fine powder having a particle-size distribution of <500 μm. The TPU powder was placed, in known per se manner, in a tempered mould (for respective temperatures, see individual Examples), after 30 to 60 seconds the excess TPU powder was poured off and afterwards the TPU remaining in the mould was sintered within 2 minutes. After the mould had been cooled, the TPU film was removed. In all the Examples and Comparison Examples the film obtained was soft and elastic and exhibited no voids or bubbles whatsoever.

Composition of the TPUs (thermoplastic polyurethanes):

Examples 2, 4 and Comparisons 1 and 2

1.0 mol De2020
0.43 mol PE 225B
3.76 mol 1,4 BDO
40 ppm DBTL

| Example 2 | Example 4 | Comparison 1 | Comparison 2 |
|---|---|---|---|
| 5.06 mol HDI | 4.98 mol HDI | 5.19 mol HDI | 5.14 mol HDI |

Example 5

1.0 mol PE 225B
0.43 mol Acclaim 2220
3.43 mol 1,6 HDO
4.67 mol HDI
1.0 wt. % (based on PE 225B) of Stabaxol P200
60 ppm DBTL Example 6

1.0 mol Capa 225
2.36 mol 1,6 HDO
3.29 mol HDI
60 ppm DBTL

Examples 1 and 3 and Comparison 3

1.0 mol PE 80B
0.82 mol 1,4 BDO
200 ppm tin dioctoate

| Example 1 | Example 3 | Comparison 3 |
|---|---|---|
| 1.765 mol MDI | 1.775 mol MDI | 1.82 mol MDI |

All TPUs contained 0.2 wt. % ethylene bis-stearylarnide, 0.5 wt. % Irganox® 1010, 0.4 wt. % Tinuvin® 328 and 0.4 wt. % Tinuvin® 622, in each case based on TPU. The content of catalysts (DBTL and tin dioctoate) is based on total polyol.

| | |
|---|---|
| DBTL: | Dibutyltin dilaurate |
| DE2020: | Polycarbonate diol based on 1,6-hexanediol and having an average molecular weight $\overline{M}_n$ of approx. 2000 g/mol |
| PE 225B: | Polybutanediol adipate having an average molecular weight $\overline{M}_n$ of approx. 2250 g/mol |
| 1,4 BDO: | 1,4-Butanediol |
| PE 80B: | Polybutanediol adipate with $\overline{M}_n$ approx. 800 g/mol |
| Capa ® 225: | Polycaprolactone diol with $\overline{M}_n$ approx. 2000 g/mol (Solvay Interox) |
| HDI: | Hexamethylene diisocyanate |
| MDI: | 4,4'-Diphenylmethane diisocyanate |
| Irganox ® 1010: | Tetrakis[methylen-(3,5-di-tert.-butyl-4-hydroxyhydrocinnamate)]methane (Ciba Geigy) |
| Tinuvin ® 328: | 2-(2'-Hydroxy-3',5'-di-tert.-amylphenyl)benzotriazole (Ciba Geigy) |
| Tinuvin ® 622: | Dimethylsuccinate polymer with 4-hydroxy-2,2,6,6-tetramethyl-1-piperidine ethanol (Ciba Geigy) |
| 1,6 HDO: | 1,6-Hexanediol |
| Acclaim ® 2220: | Polyether polyol with polyoxypropylene-polyoxyethylene units (with approx. 85% primary hydroxyl groups and an average molecular weight $\overline{M}_n$ of approx. 2000 g/mol (Lyondell)) |
| Stabaxol ® P200: | Aromatic polycarbodiimide (Rhein-Chemie) |

The following measurements were made on the materials obtained in the Examples:

1) Measurements of the Solution Viscosity

For this, 99.7 g N-methyl-2-pyrrolidone with 0.1% dibutylamine and 0.4 g TPU powder were weighed out. The samples were stirred on a magnetic stirrer.

MDI samples were dissolved at room temperature and left to stand overnight.

HDI samples were dissolved at approximately 70° C. over approximately 1 hour and cooled to room temperature overnight.

The samples and a blank reading (pure solvent) were measured at 25° C. on a viscosity test assembly from the firm Schott.

The relative solution viscosity is calculated from the time (solution) divided by the time (solvent).

The viscosity test assembly from Schott consists of:

viscosity test assembly AVS 400, measuring stand ASV/S, glass thermostat, Ubbelohde viscometer type 50110.

The MVR measurements were carried at 190° C. and 21.2 N and 212 N respectively, with a preheating time of 5 minutes, in accordance with ISO 1133.

What is claimed is:

1. A process for producing a thermoplastic polyurethane film comprising sintering in a heated mould at least one particulate thermoplastic polyurethane, wherein said thermoplastic polyurethane has:

(i) a melt index of 20 to 100, measured at 190° C. and under an applied force of 21.2N;

(ii) a relative solution viscosity of 1.15 to 1.45, the relative solution viscosity being determined by, measuring the viscosity (a) of a solution of 0.4 grams of said thermoplastic polyurethane in 99.7 grams N-methyl-2-pyrrolidone containing 0.1% dibutylamine at 25° C., measuring the viscosity (b) of N-methyl-2-pyrrolidone containing 0.1% dibutylamine at 25° C., and dividing viscosity (a) by viscosity (b); and (iii) a Shore A hardness of 80 to 98.

2. The process of claim 1, wherein sintering is carried out at a mould temperature of 180 to 215° C.

3. The process of claim 1, wherein sintering is carried out at a mould temperature of 190 to 210° C.

4. The process of claim 1, wherein said particulate thermoplastic polyurethane has an average particle size of 50 to 800 μm.

5. The process of claim 1 wherein said thermoplastic polyurethane is the reaction product of:
(a) 100 to 60 mole % hexamethylene diisocyanate, and 0 to 40 mole % of aliphatic diisocyantes other than hexamethylene diisocyanate;
(b) a polyol having an average molecular weight of between 600 to 5000 g/mole; and
(c) a chain extender having an average molecular weight of between 60 and 500 g/mole.

6. The process of claim 5 wherein said chain extender (c) comprises 80 to 100 weight % of 1,6-hexanediol, and 0 to 20 weight % of a chain extender other than 1,6-hexanediol having an average molecular eight of 60 to 500 g/mole.

7. The process of claim 1 wherein said particulate thermoplastic polyurethane, based on 100 parts by weight, comprises:
(a) 40 to 99.5 parts by weight of thermoplastic polyurethane prepared from aromatic diisocyanates; and
(b) 0.5 to 60 parts by weight of thermoplastic polyurethane prepared from aliphatic diisocyanates.

8. The process of claim 7 wherein thermoplastic polyurethane (a) is prepared from 4,4'-diphenylmethane diisocyanate, and thermoplastic polyurethane (b) is prepared from at least one aliphatic diisocyanate selected from 1,6-hexamethylene diisocyanate, isophorone diisocyanate and 4,4'-dicyclohexylmethane diisocyanate.

\* \* \* \* \*